(12) United States Patent
Ward et al.

(10) Patent No.: US 8,133,936 B2
(45) Date of Patent: *Mar. 13, 2012

(54) PRINTING INK

(75) Inventors: Jeremy Ward, Broadstairs (GB); Nigel Gould, Broadstairs (GB)

(73) Assignee: Sericol Limited (GB)

( * ) Notice: Subject to any disclaimer, the term of this patent is extended or adjusted under 35 U.S.C. 154(b) by 144 days.

This patent is subject to a terminal disclaimer.

(21) Appl. No.: 12/298,754

(22) PCT Filed: Apr. 19, 2007

(86) PCT No.: PCT/GB2007/001416
§ 371 (c)(1),
(2), (4) Date: Mar. 19, 2009

(87) PCT Pub. No.: WO2007/125273
PCT Pub. Date: Nov. 8, 2007

(65) Prior Publication Data
US 2009/0305005 A1    Dec. 10, 2009

(30) Foreign Application Priority Data

Apr. 27, 2006 (GB) .................................. 0608463.6

(51) Int. Cl.
*C09D 11/00* (2006.01)
(52) U.S. Cl. ..................... 523/160; 523/161; 428/195.1; 106/31.13; 106/31.27; 347/100

(58) Field of Classification Search .................. 523/160, 523/161

See application file for complete search history.

(56) References Cited

U.S. PATENT DOCUMENTS

| 5,040,001 A * | 8/1991 | Dunn et al. ..................... 347/86 |
| 2004/0006157 A1 | 1/2004 | Gloster et al. |

FOREIGN PATENT DOCUMENTS

| EP | 1 331 251 A | 7/2003 |
| EP | 1551931 A1 | 1/2004 |
| EP | 1524279 A1 | 4/2005 |
| EP | 1674499 A1 | 6/2006 |
| WO | WO 02/38687 A1 | 5/2002 |
| WO | WO 03/010249 A1 | 2/2003 |
| WO | WO 2004/090053 A1 | 10/2004 |
| WO | WO 2005/026270 A1 | 3/2005 |

* cited by examiner

*Primary Examiner* — Doris Lee
(74) *Attorney, Agent, or Firm* — Wood, Phillips, Katz, Clark & Mortimer

(57) ABSTRACT

This invention relates to an ink-jet ink substantially free of water and volatile organic solvents comprising at least one monofunctional (meth)acrylate monomer, including phenoxyethyl acrylate; at least one monofunctional N-vinyl amide monomer, including N-vinyl caprolactam; at least one radical photoinitiator; and at least one coloring agent. The ink has a viscosity of less than 100 mPas at 25° C., and the molar ratio of the at least one monofunctional (meth)acrylate monomer to the at least one monofunctional N-vinyl amide monomer is from 1.0 to 6.0.

18 Claims, 2 Drawing Sheets

PRINTING INK

Figure 1:
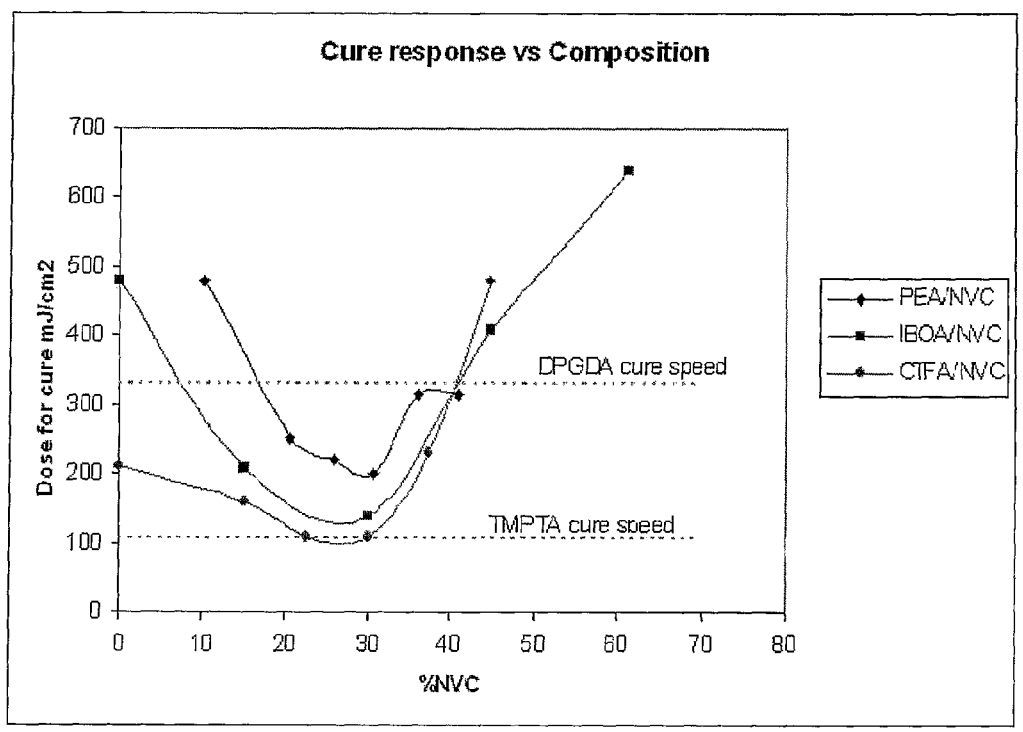

This invention concerns inks for use in ink-jet printers. In particular, this invention concerns inks for use in ink-jet printers that are cured using ultraviolet radiation.

In ink-jet printing, minute droplets of black, white or coloured ink are ejected in a controlled manner from one or more reservoirs or printing heads through narrow nozzles on to a substrate which is moving relative to the reservoirs. The ejected ink forms an image on the substrate. For high-speed printing, the inks must flow rapidly from the printing heads, and, to ensure that this happens, they must have in use a low viscosity, typically below 100 mPas at 25° C. although in most applications the viscosity should be below 50 mPas, and often below 25 mPas. Typically, when ejected through the nozzles, the ink has a viscosity of less than 25 mPas, preferably 5-15 mPas and ideally 10.5 mPas at the jetting temperature which is often elevated to about 40° C. (the ink might have a much higher viscosity at ambient temperature). The inks must also be resistant to drying or crusting in the reservoirs or nozzles. For these reasons, ink-jet inks for application at or near ambient temperatures are commonly formulated to contain a large proportion of a mobile liquid vehicle or solvent. In one common type of ink-jet ink this liquid is water— see for example the paper by Henry R. Kang in the Journal of Imaging Science, 35(3), pp. 179-188 (1991). In those systems, great effort must be made to ensure the inks do not dry in the head due to water evaporation. In another common type the liquid is a low-boiling solvent or mixture of solvents— see, for example, EP 0 314 403 and EP 0 424 714. Unfortunately, ink-jet inks that include a large proportion of water or solvent cannot be handled after printing until the inks have dried, either by evaporation of the solvent or its absorption into the substrate. This drying process is often slow and in many cases (for example, when printing on to a heat-sensitive substrate such as paper) cannot be accelerated.

Another type of ink-jet ink contains unsaturated organic compounds, termed monomers, which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures. In such ink-jet inks it is necessary to use monomers possessing a low viscosity.

However, ink-jet inks largely based on monomers suffer from significant draw-backs compared to ink-jet inks containing solvent or more traditional inks such as screen or flexographic systems, where the higher viscosities allowed give greater formulation latitude. These types of ink can have significant amounts of the monomer content replaced with acrylate oligomers or inert thermoplastic resins whose higher molecular weight leads to a reduction in the number of bonds that must be formed during the curing process. When each link is formed the bond length between the repeat units reduces leading to shrinkage of the cured film and unless this is controlled stress is imparted to the substrate. With plastic substrates this film shrinkage can lead to severe embrittlement of the printed article and post print finishing, such as guillotining, becomes problematic.

Traditionally UV ink-jet inks are formulated with difunctional acrylate monomers in order to achieve adequate cure speeds. Inks produced from these types of materials suffer badly from film shrinkage and consequent substrate embrittlement. Theoretically it should be possible to reduce shrinkage by use of wholly monofunctional acrylate or vinyl monomer based systems, however this approach has generally been avoided due to very low cure speeds associated with monofunctional monomers.

There is therefore a requirement in the art for inks which achieve a balance between cure speed and film shrinkage without compromising the low viscosity of the ink-jet ink.

Accordingly, the present invention provides an ink-jet ink comprising at least one monofunctional (meth)acrylate monomer; at least one monofunctional N-vinyl amide monomer; at least one radical photoinitiator; and at least one colouring agent; wherein the ink has a viscosity of less than 100 mPas at 25° C., and wherein the molar ratio of the at least one monofunctional (meth)acrylate monomer to the at least one monofunctional N-vinyl amide monomer is from 1.0 to 6.0.

Figure 2:
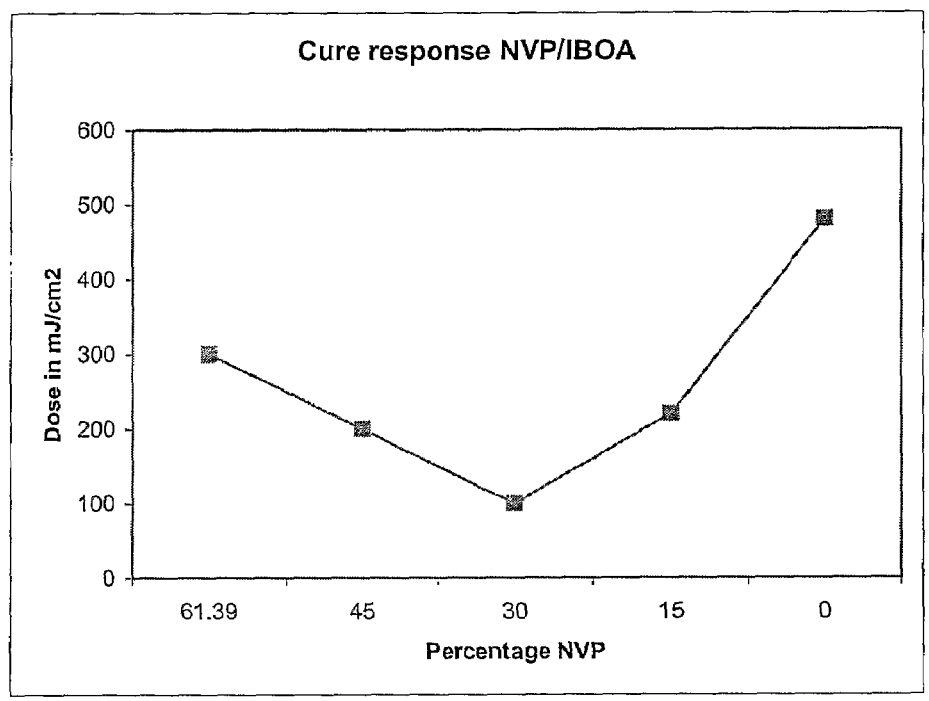

The present invention will now be described with reference to the accompanying drawings, in which:

FIG. 1 shows a graph of cure response against composition for three ink-jet inks of the present invention, FIG. 2 shows a graph of cure response against composition for an ink-jet ink of the present invention containing NVP and IBOA.

The ink-jet ink of the present invention dries primarily by curing, i.e. by the polymerisation of the monomers present, as discussed hereinabove, and hence is a curable ink. The ink does not, therefore, require the presence of water or a volatile organic solvent to effect drying of the ink, although the presence of such components may be tolerated. Preferably, however, the ink-jet ink of the present invention is substantially free of water and volatile organic solvents.

As explained hereinabove incorporating significant amounts of monofunctional monomers in inks has traditionally led to very poor UV cure response and hence multifunctional monomers have had to be added to boost cure. It has now been found that, at certain ratios, combinations of monofunctional (meth)acrylate monomers with an N-vinyl amide monomers provide a surprising synergistic effect, namely higher cure speeds are observed than for either of the component monomers when taken alone. This effect is particularly beneficial in ink-jet inks formulated with monofunctional monomers allowing cure speeds which are similar or even better than those observed with difunctional and even trifunctional (meth)acrylate monomer-based inks.

N-Vinyl amides are well-known monomers in the art and a detailed description is therefore not required. N-Vinyl amides have a vinyl group attached to the nitrogen atom of an amide which may be further substituted in an analogous manner to the (meth)acrylate monomers.

Preferred examples are N-vinyl caprolactam (NVC) and N-vinyl pyrrolidone (NVP):

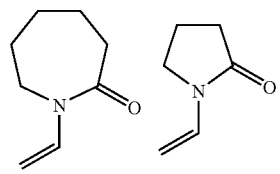

The monofunctional (meth)acrylate monomers are also well known in the art and are preferably the esters of acrylic acid. Preferred examples include:

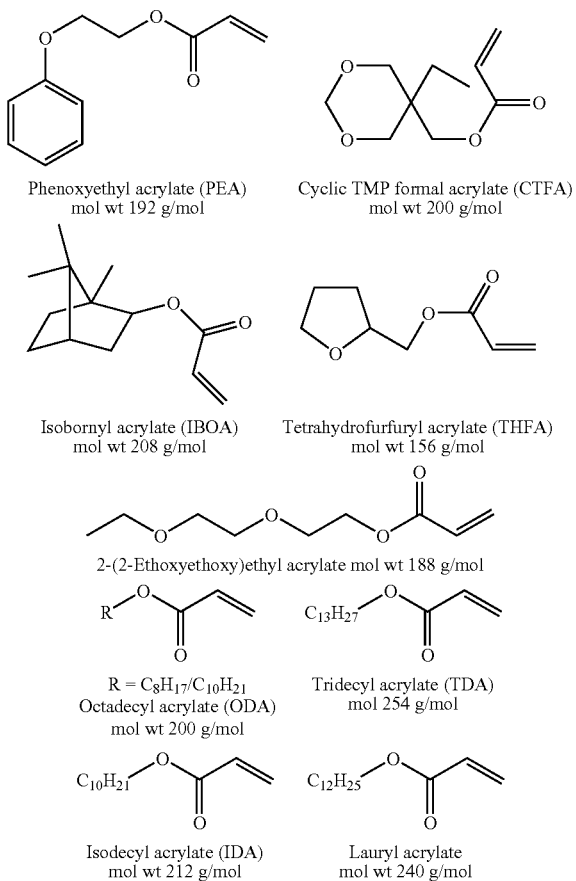

The substituents of the monofunctional monomers are not limited other than by the constraints imposed by the use in an ink-jet ink, such as viscosity, stability, toxicity etc. The substituents are typically alkyl, cycloalkyl, aryl and combinations thereof, any of which may be interrupted by heteroatoms. Non-limiting examples of substituents commonly used in the art include $C_{1-18}$ alkyl, $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. The substituents may together also form a cyclic structure.

In a preferred embodiment, the monofunctional (meth) acrylate is a cyclic monofunctional (meth)acrylate. That is, the radical covalently bonded to the (meth)acrylate unit is cyclic. The cyclic radical may be saturated or unsaturated, including aromatic. Preferred cyclic monofunctional (meth) acrylates are phenoxyethyl acrylate (PEA), cyclic TMP formal acrylate (CTFA), isobornyl acrylate (IBOA), tetrahydrofurfuryl acrylate (THFA) or mixtures thereof. Most preferably, the monofunctional (meth)acrylates present are exclusively cyclic, i.e. they are the sole monofunctional (meth)acrylate(s) present.

The total amount of the at least one monofunctional (meth) acrylate monomer and the at least one monofunctional N-vinyl amide monomer in combination is preferably at least 60 wt %, more preferably at least 70 wt % and most preferably at least 80 wt %, based on the total weight of the ink.

The molar ratio of the at least one monofunctional (meth) acrylate monomer to the at least one monofunctional N-vinyl amide monomer is from 1.0 to 6.0. The upper limit to this ratio is preferably 4.0 or less, more preferably 3.5 or less, more preferably 2.0 or less and most preferably 1.6 or less. The lower limit to this ratio is preferably 1.1 or more, more preferably 1.2 or more, more preferably 1.3 or more and most preferably 1.5 or more. A particularly preferred range is 1.25 to 1.53.

Monofunctional acrylates and monofunctional N-vinyl amide, when combined, offer significant improvements in cure response over the non-combined monomers. All of the combinations tested exhibited a minimum in the dose of UV light required for cure when cure response was plotted against monomer blend composition (further details are given in the examples hereinbelow). The depth of these minima are dependent on the individual cure speeds of the component monomers: the faster curing the acrylate monomers when taken alone, the deeper the minimum in UV dose required.

Of those tested, many blends exhibited faster cure speeds than DPGDA (a difunctional acrylate) and in some cases speeds equivalent to TMPTA (a trifunctional acrylate). These optimised blends provide significant advantages: high cure speeds can be achieved without compromising film properties such as flexibility, which is often sacrificed when multifunctional acrylates are employed.

It is possible to modify further the film properties of the ink-jet inks by inclusion of multifunctional monomers, oligomers or inert resins, such as thermoplastic acrylics. However, it should be noted that in the case of oligomers and multifunctional monomers the flexibility may be adversely affected and also that some adjustments to stoichiometry may be required to retain optimum cure speed.

Examples of the multifunctional acrylate monomers which may be included in the ink-jet ink formulation include hexanediol diacrylate, trimethylolpropane triacrylate, pentaerythritol triacrylate, polyethyleneglycol diacrylate, for example, tetraethyleneglycol diacrylate), dipropyleneglycol diacrylate, tri(propylene glycol) triacrylate, neopentylglycol diacrylate, bis(pentaerythritol) hexa-acrylate, and the acrylate esters of ethoxylated or propoxylated glycols and polyols, for example, propoxylated neopentyl glycol diacrylate, ethoxylated trimethylolpropane triacrylate, and mixtures thereof. Particularly preferred are difunctional acrylates with a molecular weight greater than 200.

In addition, suitable multifunctional acrylate monomers include esters of methacrylic acid (i.e. methacrylates), such as hexanediol dimethacrylate, trimethylolpropane trimethacrylate, triethyleneglycol dimethacrylate, diethyleneglycol dimethacrylate, ethyleneglycol dimethacrylate; 1,4-butanediol dimethacrylate.

Mixtures of (meth)acrylates may also be used.

In one embodiment the ink is substantially free of multifunctional monomer, meaning that only trace amounts will be present, for example as impurities in the monofunctional material or as a component in a commercially available pigment dispersion. Where multifunctional monomer is included, the multifunctional monomer is present in an amount of no more than 30 wt %, preferably no more than 25 wt %, more preferably no more than 20 wt % and most preferably no more than 15 wt % based on the total weight of the ink. The multifunctional monomer which is limited in amount may be any multifunctional monomer which could be involved in the curing reaction, such as a multifunctional (meth)acrylate monomer or a multifunctional vinyl ether.

In an embodiment the ink is substantially free of oligomeric and polymeric material meaning that only trace amounts will be present. Where oligomeric or polymeric material is included, the oligomeric and polymeric material is present in an amount of no more than 20 wt %, more preferably no more than 10 wt %, most preferably no more than 5 wt % based on the total weight of the ink. Oligomeric and polymeric materials (e.g. acrylate oligomers and inert thermoplastic resins, respectively) are known in the art and typically have a molecular weight above 500, more preferably above 1000.

In addition to the monomers described above, the compositions include a photoinitiator, which, under irradiation by, for example, ultraviolet light, initiates the polymerisation of the monomers. Preferred are photoinitiators which produce free radicals on irradiation (free radical photoinitiators) such as, for example, benzophenone, 1-hydroxycyclohexyl phenyl ketone, 2-benzyl-2-dimethylamino-(4-morpholinophenyl) butan-1-one, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure, Darocur (from Ciba) and Lucerin (from BASF).

Preferably the photoinitiator is present from 1 to 20% by weight, preferably from 4 to 10% by weight, of the ink.

The ink-jet ink of the present invention also includes a colouring agent, which may be either dissolved or dispersed in the liquid medium of the ink. Preferably the colouring agent is a dispersible pigment, of the types known in the art and commercially available such as, for example, under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

The total proportion of pigment present is preferably from 0.5 to 15% by weight, more preferably from 1 to 5% by weight.

Although the ink of the present invention cures by a free radical mechanism, the ink of the present invention may also be a so-called "hybrid" ink which cures by a radical and cationic mechanism. The ink-jet ink of the present invention, in one embodiment, therefore further comprises at least one cationically curable monomer, such as a vinyl ether, and at least one cationic photoinitiator, such as an iodonium or sulfonium salt, e.g. diphenyliodonium fluoride and triphenylsulfonium hexafluophosphate. Suitable cationic photoinitiators include the Union Carbide UVI-69-series, Deuteron UV 1240 and IJY2257, Ciba Irgacure 250 and CGI 552, IGM-C440, Rhodia 2047 and UV9380c.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The present invention also provides a method of ink-jet printing using the above-described ink and a substrate having the cured ink thereon. Suitable substrates include styrene, PolyCarb (a polycarbonate), BannerPVC (a PVC) and VIVAK (a polyethylene terephthalate glycol modified). The ink of the present invention is preferably cured by ultraviolet irradiation and is suitable for application by ink-jet printing. The present invention further provides an ink-jet ink cartridge containing the ink-jet ink as defined herein. The cartridge comprises an ink container and an ink delivery port which is suitable for connection with an ink-jet printer.

The ink-jet ink exhibits a desirable low viscosity (less than 100 mPas, preferably less than 50 mPas and most preferably less than 25 mPas at 25° C.).

(Meth)acrylate is intended herein to have its standard meaning, i.e. acrylate and/or methacrylate. Mono and multifunctional are also intended to have their standard meanings, i.e. one and two or more groups, respectively, which take part in the polymerisation reaction on curing.

The inks of the invention may be prepared by known methods such as, for example, stirring with a high-speed water-cooled stirrer, or milling on a horizontal bead-mill.

EXAMPLES

The invention will now be described, by way of example, with reference to the following example (parts given are by weight).

Example 1

Reference Example

Ink-jet ink formulations were prepared by varying the monomer composition whilst holding all the other components constant, as set out in Table 1.

TABLE 1

| Cyan formulation used for all cure response testing. | |
| --- | --- |
| Component | Percentage in formula |
| Colour concentrate | 4.53 |
| Monomer | 81.86 |
| UV stabilizer | 0.8 |
| Irgacure 184 | 1.88 |
| Acyl phosphine oxide | 8.01 |
| Benzophenone | 2.82 |
| Silicone wetting agent | 0.1 |

A series of monomers were evaluated in the above formula and compared for cure speed. Inks were drawn down onto to 220 micron gloss PVC using a 12 micron K bar applicator. The films were cured using a Svecia UV drier fitted with two independently switchable 80 W/cm lamps. In each case the UV dose required to cure the ink film to a tack-free state was measured.

The results are set out in Tables 2a and 2b which show samples cured with two lamps on full power and samples cured on half power, respectively.

TABLE 2a

| Cure speeds of monomers in test formula. | | | |
| --- | --- | --- | --- |
| Monomer | UV Dose required (mJ/cm$^2$) | No. of lamps & Power setting | Belt speed (m/min) |
| TMPTA | 105 | 2 × half power | 30 |
| CTFA | 220 | 2 × half power | 16 |
| DPGDA | 400 | 2 × half power | >10 |
| IBOA | 480 | 2 × half power | 7 |
| PEA | >480 | 2 × half power | <7 |

TABLE 2b

Cure speeds of monomers in test formula.

| Monomer | UV Dose required (mJ/cm$^2$) | No. of lamps & Power setting | Belt speed (m/min) |
|---|---|---|---|
| THFA | 500 | 2 × full power | 14 |
| EOEOEA | 840 | 2 × full power | 8 |
| NVC | 1000+ | 2 × full power | <7 |
| TDA | 1000+ | 2 × full power | <7 |
| ODA | 1000++ | 2 × full power | <<7 |
| IDA | 1000++ | 2 × full power | <<7 |
| Lauryl acrylate | 1000++ | 2 × full power | <<7 |

Example 2

Further studies on blends of monofunctional acrylate highlighted a curiosity, that a blend of monofunctional acrylate with NVC showed a non linear cure speed response, a maximum in the cure response being observed, for example, at a NVC:PEA ratio of 1:1.7 by weight. Table 3 sets out the monomer compositions which provided the maximum cure speed for each monomer pair.

TABLE 3

Monomer composition at peak cure response.

| Monomer | UV dose for cure (mJ/cm$^2$) | % NVC by weight | % monoacrylate by weight | Molar ratio Monoacrylate/NVC |
|---|---|---|---|---|
| THFA | 205 | 30 | 51.86 | 1.53 |
| IBOA | 140 | 30 | 51.86 | 1.15 |
| EOEOEA | 700 | 15 | 66.86 | 3.30 |
| IDA | 880 | 30 | 51.86 | 1.13 |
| PEA | 200 | 30 | 51.86 | 1.25 |
| CTFA | 120 | 37.5 | 44.36 | 1.47 |

The data from Tables 2 and 3 are summarised in Table 4:

TABLE 4

Minimum UV dose for individual acrylates and corresponding NVC/acrylate blends.

| | UV dose for cure (mJ/cm$^2$) | |
|---|---|---|
| Monomer | Acrylate only | Acrylate + NVC |
| THFA | 500 | 205 |
| IBOA | 480 | 140 |
| EOEOEA | 840 | 700 |
| IDA | 1000++ | 880 |
| PEA | >480 | 200 |
| CTFA | 220 | 100 |
| TMPTA | 105 | <60 |
| NVC | 1000+ | 1000+ |

FIG. 1 also shows a graphical representation of UV dose minima against the amount of NVC present. Where the amount of NVC is zero, the doses for cure are as set out in Reference Example 1. As the amount of NVC is increased the dose required for cure decreases showing that the addition of NVC advantageously increases cure speed. The increase in cure speed provides an improved ink with the maximum improvement in the cure speed being identified by the minima in FIG. 1. By way of a reference, the doses required for the cure of the di- and trifunctional acrylates DPGDA and TMPTA when taken alone are also shown in FIG. 1.

Example 3

During the evaluation it was noted that combinations of NVC and N-acryloylmorpholine (ACMO) only did not exhibit this trend. Although not wishing to be bound by theory, it is believed that this may be due to the similar nature of the unsaturation in the monomers, both having nitrogen close to the double bond.

Example 4

A formula containing a blend of NVP and IBOA was prepared and evaluated as described hereinabove with similar results which are set out in FIG. 2.

Example 5

Particularly preferred examples of ink-jet inks of the present invention are set out in Table 5:

TABLE 5

Preferred blends of acrylate and amide

| Monomer blend | Weight ratio | Comparative speed |
|---|---|---|
| THFA/NVC | 51.86/30 | Faster than DPGDA |
| IBOA/NVC | 51.86/30 | Faster than DPGDA |
| PEA/NVC | 51.86/30 | Faster than DPGDA |
| CTFA/NVC | 44.36/37.5 | Equivalent to TMPTA |
| IBOA/NVP | 51.86/30 | Equivalent to TMPTA |

Example 6

A cyan ink-jet ink formulation of the present invention was prepared by combining the following components:
Pigment Dispersion * 4.53
N Vinyl caprolactam 30.70
Phenoxyethyl acrylate 51.16
Firstcure ST-1 0.8
Irgacure 184 1.88
Acyl phosphine oxide 8.01
Benzophenone 2.82
Byk 307 0.1
*Pigment Dispersion:
SOLSPERSE 32000 10.00
FIRSTCURE ST-1 1.00
SARTOMERSR 9003 59.00 (propoxylated NPGDA—difunctional)
IRGALITE BLUE GLVO 30.00

The invention claimed is:
1. An ink-jet ink substantially free of water and volatile organic solvents comprising at least one monofunctional (meth)acrylate monomer; at least one monofunctional N-vinyl amide monomer, wherein said at least one monofunctional N-vinyl amide monomer is selected from the group consisting of N-vinyl caprolactam (NVC) and N-vinyl pyrrolidone (NVP); at least one radical photoinitiator; at least one colouring agent; wherein the ink has a viscosity of less than 100 mPas at 25° C., and wherein the molar ratio of the at least one monofunctional (meth)acrylate monomer to the at least one monofunctional N-vinyl amide monomer is from 1.1 to 2.0, and further wherein said ink-jet ink has a higher cure speed than a cure speed of an ink-jet ink which comprises only one of the at least one monofunctional (meth)acrylate monomer and the at least one monofunctional N-vinyl amide monomer.

2. An ink jet ink as claimed in claim 1, wherein the total amount of the at least one monofunctional (meth)acrylate monomer and the at least one monofunctional N-vinyl amide monomer is at least 60 wt %, based on the total weight of the ink.

3. An ink-jet ink as claimed in claim 1, wherein the ink contains no more than 30 wt % of multifunctional monomers based on the total weight of the ink.

4. An ink-jet ink as claimed in claim 1, wherein the ink contains at least one multifunctional monomer and one or more of the multifunctional monomers is a multifunctional (meth)acrylate monomer.

5. An ink-jet ink as claimed in claim 1, wherein the at least one monofunctional (meth)acrylate is selected from the group consisting of phenoxyethyl acrylate (PEA), cyclic TMP formal acrylate (CTFA), isobornyl acrylate (IBOA), tetrahydrofurfuryl acrylate (THFA), 2-(2-ethoxyethoxy}ethyl acrylate, octa/decyl acrylate (ODA), tridecyl acrylate (TDA), isodecyl acrylate (IDA) and lauryl acrylate.

6. An ink-jet ink as claimed in claim 1, wherein the at least one monofunctional (meth)acrylate is acyclic monofunctional (meth)acrylate.

7. An ink-jet ink as claimed in claim 1, wherein the molar ratio of the at least one monofunctional (meth)acrylate monomer to the at least one monofunctional N-vinyl amide monomer is from 1.2 to 2.0.

8. An ink-jet ink as claimed in claim 2, wherein the total amount is at least 70 wt %.

9. An ink-jet ink as claimed in claim 8, wherein the total amount is at least 80 wt %.

10. An ink-jet ink as claimed in claim 5, wherein the ink contains a combination of monomers selected from the group consisting of THFA tetrahydrofurfuryl acrylate)/NVC (N-vinyl caprolactam), IBOA (isobornyl acrylate)/NVC (N-vinyl caprolactam), PEA(phenoxyethyl acrylate)/NVC(N-vinyl caprolactam), CTFA (cyclic TMP formal acrylate)/NVC(N-vinyl caprolactam), IBOA(isobornyl acrylate)/ACMO (N-acryloylmorpholine) and IBOA(isobornyl acrylate)/NVP (N-vinyl pyrrolidone).

11. An ink-jet ink as claimed in claim 6, wherein the ink comprises at least one cyclic monofunctional (meth)acrylate as the sole monofunctional (meth)acrylate(s) present.

12. An ink-jet ink as claimed in claim 6, wherein the ink contains a combination of monomers selected from the group consisting of THFA (tetrahydrofurfuryl acrylate)/NVC (N-vinyl caprolactam), IBOA (isobornyl acrylate)/NVC (N-vinyl caprolactam), PEA(phenoxyethyl acrylate)/NVC (N-vinyl caprolactam), CTFA (cyclic TMP formal acrylate)/NVC(N-vinyl caprolactam) , IBOA(isobornyl acrylate)/ACMO (N-acryloylmorpholine) and IBOA(isobornyl acrylate)/NVP(N-vinyl pyrrolidone).

13. An ink-jet ink as claimed in claim 6, wherein the cyclic monofunctional (meth)acrylate is phenoxyethyl acrylate (PEA), cyclic TMP formal acrylate (CTFA), isobornyl acrylate (IBOA), tetrahydrofurfuryl acrylate (THFA), or mixtures thereof.

14. An ink-jet ink as claimed in claim 11, wherein the cyclic monofunctional (meth)acrylate is phenoxyethyl acrylate (PEA), cyclic TMP formal acrylate (CTFA), isobornyl acrvlate (IBOA), tetrahydrofurfuryl acrylate (THFA), or mixtures thereof.

15. An ink-jet ink as claimed in claim 11, wherein the ink contains a combination of monomers selected from the group consisting of THFA (tetrahydrofurfulyl acrylate)/NVC(N-vinyl caprolactam), IBOA (isobornyl acrylate)/NVC (N-vinyl caprolactam), PEA(phenoxyethyl acrylate)/NVC(N-vinyl caprolactam),CTFA (cyclic TMP formal acrylate)/NVC(N-vinyl caprolactam), IBOA(isobornyl acrylate)/ACMO (N-acryloylmorpholine) and IBOA(isobornyl acrylate)/NVP (N-vinyl pyrrolidone).

16. A method of ink-jet printing, comprising printing the ink-jet ink as claimed in claim 1 onto a substrate and curing the ink.

17. A substrate having the ink-jet ink as claimed in claim 1 printed thereon.

18. An ink-jet ink cartridge containing the ink-jet ink as claimed in claim 1.

* * * * *